UNITED STATES PATENT OFFICE.

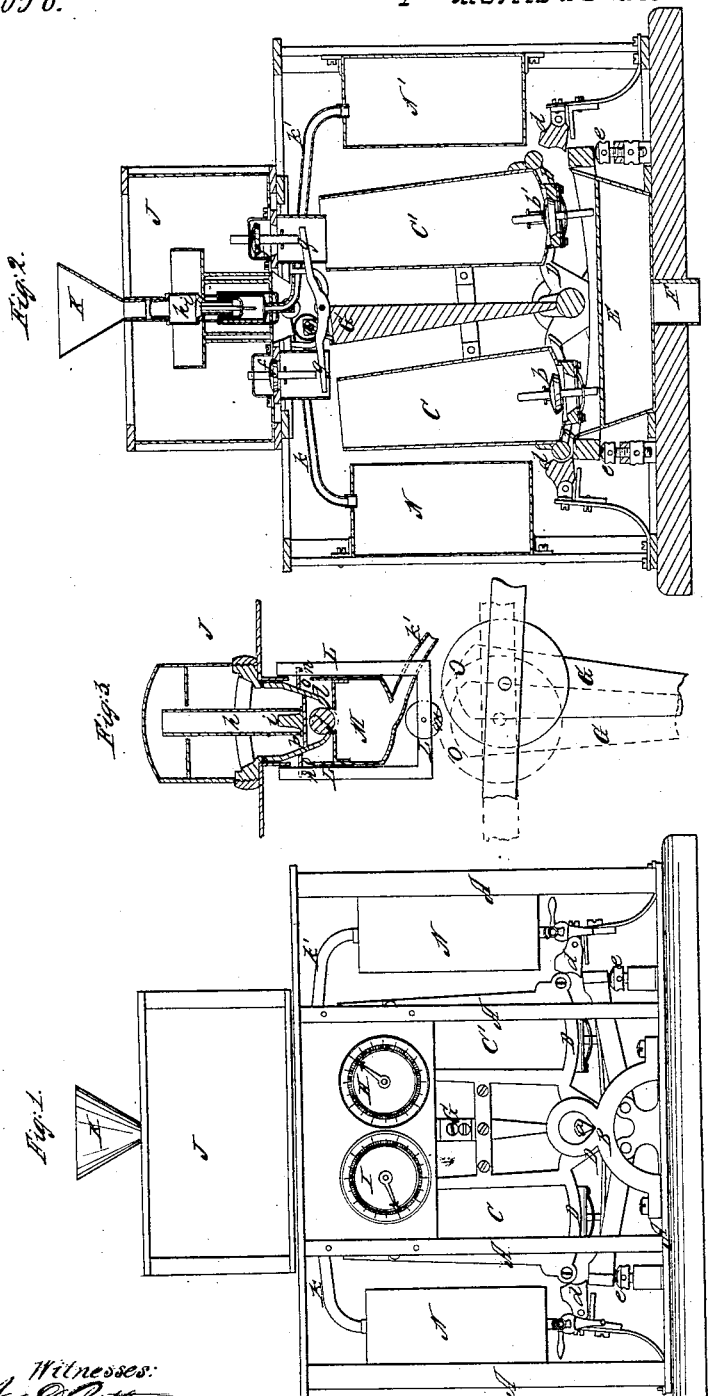

EDWARD PAYNE, OF LONDON, ENGLAND.

IMPROVED APPARATUS FOR MEASURING AND TESTING SPIRITS AND OTHER DISTILLATES.

Specification forming part of Letters Patent No. 46,058, dated January 24, 1865.

*To all whom it may concern:*

Be it known that I, EDWARD PAYNE, of the city of London, England, have invented certain new and useful improvements in spiritmeters, to be attached to distilling and other similar apparatus for measuring and ascertaining the proof of liquids distilled thereby or flowing through the same; and I do hereby declare that the following is a full, clear, and exact description of the construction and operation of the same, reference being had to the accompanying drawings, making a part of this specification, in which—

Figure 1 represents a front elevation of the same with the casing or boxing removed to show the interior thereof. Fig. 2 represents a vertical cross-section thereof; and Fig. 3 represents a vertical section through the sampling apparatus, by which measured or defined quantities of the spirit as it is distilled or flows through is preserved to afterward ascertain the standard of proof of the spirit.

Similar letters of reference, where they occur in the separate figures, denote like parts of the apparatus in all the drawings.

My invention consists in an apparatus that is designed to be attached to a distilling or other similar evaporating and condensing mechanism, through which the liquid or spirit flows, for the purpose of measuring the quantity that passes through, and also for preserving samples of the same to afterward ascertain the proof, standard, or specific density of the same.

In ascertaining the amount of revenue due to the Government upon distilled liquors many difficulties and errors, if not gross frauds, occur in arriving at the exact, or even the approximate, quantity that passes over from the still or other apparatus, owing to the standard of proof at which the spirit is driven over, it being sometimes higher and again lower in proof. The quantity passing over may be readily measured, but prior to my invention no means of ascertaining the quality or proof of the spirit as it passes over has, so far as I can ascertain, been practically essayed or used.

By my invention, the apparatus being inaccessible to the manufacturer or operator, and solely under the control of the inspector or assessor, no errors or frauds can occur, and thus it becomes of immense value in ascertaining, not only the quantity, but the proof quality, of the distilled spirit.

To enable others skilled in the art to make and use my invention, I will proceed to describe the same with reference to the drawings, first stating in general terms that the apparatus is attached to a still or other similar evaporating and condensing mechanism at any point or part thereof most convenient, and where the spirit passes through or over before it flows into the general receiver.

A represents a frame for containing the mechanism that constitutes the spiritometer, the whole being suitably closed, cased, or boxed up, so that it may not be tampered with by any one except the inspector or assessor under whose special charge it is placed.

In suitable bearings, B, in the frame A are supported, by "knife-edged" supports or heads $a$, (one at each end of the apparatus, one only being seen in the drawings,) the receiving vessels or tanks C C', which for convenience are placed upon a vibrating yoke or frame, D, but which may be arranged in any other manner that will serve the purpose for which they are designed, as will be explained hereinafter. These receiving vessels or tanks C C' are alternately filled, or partially so, by the distilled spirit as it passes through, and when a certain quantity is received in one it overbalances the empty one, and in falling, dropping, or rocking upon its frame a valve, $b$, in the bottom thereof is opened, as shown on the left of Fig. 2, and the liquid or spirit runs out into a receiver, E, and thence through a pipe, F, to any suitable place of deposit. As the tank C is being emptied of its contents the other one, C', is being filled until it in turn receives enough to overbalance the empty tank, when the frame again rocks or the tank C' drops, and its valve $b'$, being opened by the act of rocking or dropping, its contents are flowed out into E, and thence through the pipe F, to the common place of deposit.

As an equipoise or regulator to cause the frame D or the tanks to vibrate or oscillate with a regularity due to the quantity of liquid contained in them alternately, I have arranged a balance, G, which, being heaviest at its upper end, is slow to start, and holds the tanks in position until the exact quantity necessary to tip or oscillate the frame is received in the one that is being filled, and when the tank does drop or the frame oscillate this balance or regulator gives it sufficient momentum to raise its valve when the stem thereof strikes upon the piece $c$.

To prevent the tanks or their frame from striking so hard as to cause a jar, I arrange spring-stops or cushions d to check them gently, and to regulate the extent of motion of the tanks or frame I further provide adjustable stops e, which can be regulated at pleasure. Every tankful that is thus caught and allowed to pass through to the common receiver is recorded upon the dials H I, which may be worked by any of the known contrivances used for recording measured quantities of liquid that pass through a meter of any kind.

The area of the tanks c c', I make greater below than toward the top, so that there shall be no tendency of the tanks or frame to tip until sufficient liquid is accumulated to effect that purpose. The liquid or spirit from the still finds its way into the tanks c c' alternately through valves f f', which close by their own weight, and are opened by the motion of the tanks or their frame through the intervention of a vibrating bar, g, that is struck or operated by them, as seen in Fig. 2. The above description includes substantially the measuring and recording of the spirit that passes through the apparatus, but would give no idea of its proof, and consequently other means must be provided for ascertaining its quality or proof. This I accomplish as follows:

The spirit is brought into the chamber J through a funnel K, and thence through an apparatus arranged in said chamber, which, while it retains and passes through in a different direction a small sample of the spirit, allows the bulk of it to flow over into the chamber J, and thence by the valves f f', as heretofore described, into the measuring-tanks.

In Fig. 2 I have shown one form of sampling apparatus, and in Fig. 3 a modified, and, perhaps, more simple form, and which, being on a larger scale and more distinct, I shall more fully confine my description to. In this sampling apparatus h is a tube, which may contain, say, a wine-glassful of the spirit, more or less, and below this tube there is a valve, i, arranged on a frame, L, which closes and opens this tubular chamber as the said frame is raised or lowered. And below the valve i there is a ball-valve, j, that covers another passage or opens it, as the case may be, through which the measured or sampled quantity in h may pass, under certain circumstances, down to a chamber, M, and thence through suitable tubes, k k', to one or the other of the closed tanks N N', which contain these samples, which are afterward to be tested by any of the known formulas for ascertaining the strength or proof of spirits, or by a formula which I have myself prepared, as may be found most accurate.

It will be seen that every time one of the tanks C is emptied, which may contain gallons, I have preserved and carried into another receptacle a specimen of that content and sufficient to ascertain by average the quality or proof of the whole passed over. The difference in the temperature of the spirit passing over would probably vary its specific gravity, but when I preserve constantly specimens of what passes over, the general average of their proof will give almost the exact amount subject to the revenue tax, or at least an amount so nearly exact as not to make an appreciable difference from a perfectly true result.

The sampling devices are operated as follows: On the top of the piece G there is a roller, O, which, as the part G vibrates with the tanks C C' or their frames, strikes a small roller, m, underneath and fastened to the frame L, and thus raising up said frame. On this frame L there are two pins, n n, which, when the frame is raised up, carry up with it the bar o and the valve-supporters p q and their respective valves i j, all of which are connected, as shown in Fig. 3. The effect of this is that the tube h is closed by the valve i, while the valve j is raised from its seat, and the spirit previously retained above it passes down through M and one or the other of the pipes k k' to one or the other of the sample-holders N N', as the case may be. When the frame L is again let down by the roller o passing beyond it the valve i opens and that, j, is closed, when another sample is collected, to be again transferred to the sample-receiver, as above described, by the next operation of the measuring-tanks. I can, of course, use one, two, or more of these sample-receivers, and take as much or as little of the spirit and as often as I may find it necessary for the complete ascertaining of the proof of the spirit being distilled. The usual cocks for drawing off these tanks or receivers are provided, but every part that could be tampered with may be locked or sealed up, and the instrument go on for weeks or months measuring the quantity of spirit that passes over or through and constantly preserving samples of it, so that its proof may be ascertained at any time, and the whole computed from a formula prepared for the purpose without the trouble of special calculations therefor.

Having thus fully described the nature, object, and purpose of my invention, what I claim therein as new, and desire to secure by Letters Patent, is—

In connection with a still or distillery, the combined use in one instrument of a measuring and of a sampling apparatus, substantially as herein described, whereby small quantities of the spirit that passes over or through the apparatus is retained for an after test of its proof and beyond the reach of the operator, while the measured bulk or quantity passes through to any common receiver, substantially as described.

EDWD. PAYNE.

Witnesses:
THOMAS L. HIGGINSON,
P. B. DRUMOND.